(12) United States Patent
Matsumura et al.

(10) Patent No.: US 10,714,731 B2
(45) Date of Patent: Jul. 14, 2020

(54) CONNECTION MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi-ken (JP)

(72) Inventors: Nobuyuki Matsumura, Mie (JP); Shinichi Takase, Mie (JP); Yusuke Suzuki, Aichi-ken (JP); Atsushi Yamanaka, Aichi-ken (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/335,533

(22) PCT Filed: Sep. 15, 2017

(86) PCT No.: PCT/JP2017/033469
§ 371 (c)(1),
(2) Date: Mar. 21, 2019

(87) PCT Pub. No.: WO2018/061826
PCT Pub. Date: Apr. 5, 2018

(65) Prior Publication Data
US 2020/0020913 A1 Jan. 16, 2020

(30) Foreign Application Priority Data
Sep. 30, 2016 (JP) .................. 2016-193674

(51) Int. Cl.
*H01M 2/20* (2006.01)
*H01M 2/10* (2006.01)
*H01R 4/30* (2006.01)

(52) U.S. Cl.
CPC ......... *H01M 2/206* (2013.01); *H01M 2/1077* (2013.01); *H01M 2220/20* (2013.01); *H01R 4/308* (2013.01)

(58) Field of Classification Search
CPC combination set(s) only.
See application file for complete search history.

(56) References Cited

U.S. PATENT DOCUMENTS 5,499,927 A * 3/1996 Ohno ...................... H01R 13/28
29/408
5,795,193 A * 8/1998 Yang .................... H01R 9/2458
439/620.27

(Continued)

FOREIGN PATENT DOCUMENTS

| JP | 2011-049155 A | 3/2011 |
| JP | 2013-045508 A | 3/2013 |

(Continued)

OTHER PUBLICATIONS

International Search Report issued in PCT/JP2017/033469.

*Primary Examiner* — Binh B Tran
*Assistant Examiner* — Krystal Robinson
(74) *Attorney, Agent, or Firm* — Greenblum & Bernstein, P.L.C.

(57) ABSTRACT

A connection module is a flat-shaped connection module that is to be attached to a power storage element group formed by aligning a plurality of power storage elements with positive and negative electrode terminals and includes a first bus bar module, a second bus bar module, and insulating fixing members. The first and second bus bar modules include sheet members that hold the plurality of bus (Continued)

bars arranged in an alignment direction of the power storage elements. The fixing members are coupled to the sheet members to integrate and fix the first bus bar module and the second bus bar module.

6 Claims, 9 Drawing Sheets

(56) References Cited

U.S. PATENT DOCUMENTS

| | | | |
|---|---|---|---|
| 6,290,552 B1* | 9/2001 | Saito | H01M 2/206 439/736 |
| 6,544,077 B2* | 4/2003 | Ikeda | H01M 2/1077 174/72 R |
| 8,426,056 B2* | 4/2013 | Ikeda | H01M 2/206 429/156 |
| 8,777,668 B2* | 7/2014 | Ikeda | H01M 2/206 439/627 |
| 9,023,499 B2 | 5/2015 | Takase et al. | |
| 9,150,115 B2* | 10/2015 | Ikeda | H02G 3/0437 |
| 9,515,356 B2* | 12/2016 | Zeng | H01M 10/4257 |
| 9,748,540 B2 | 8/2017 | Ikeda et al. | |
| 10,003,151 B1* | 6/2018 | Sato | H01R 13/405 |
| 2011/0027634 A1 | 2/2011 | Kishimoto et al. | |
| 2011/0269321 A1* | 11/2011 | Mizoguchi | H01R 12/613 439/77 |
| 2012/0015550 A1* | 1/2012 | Ikeda | H01M 2/206 439/391 |
| 2012/0183833 A1* | 7/2012 | Ikeda | H01M 10/48 429/121 |
| 2012/0328920 A1 | 12/2012 | Takase et al. | |
| 2013/0161053 A1* | 6/2013 | Okamoto | H01M 2/1077 174/68.1 |
| 2013/0288105 A1* | 10/2013 | Niedzwiecki | H01M 10/0481 429/156 |
| 2014/0186676 A1* | 7/2014 | Ebisawa | H01R 13/74 429/100 |
| 2015/0010808 A1* | 1/2015 | Shoji | H01M 2/206 429/158 |
| 2015/0056487 A1* | 2/2015 | Kobayashi | H01M 10/0468 429/120 |
| 2015/0380699 A1 | 12/2015 | Ikeda et al. | |
| 2016/0172652 A1* | 6/2016 | Ichikawa | H01M 2/206 429/121 |
| 2016/0268702 A1* | 9/2016 | Ichikawa | H01R 4/029 |
| 2017/0110705 A1* | 4/2017 | Tosaya | H01M 2/206 |
| 2017/0179458 A1 | 6/2017 | Sato et al. | |
| 2017/0179459 A1 | 6/2017 | Sato et al. | |
| 2017/0179460 A1 | 6/2017 | Gotoh et al. | |
| 2018/0088179 A1* | 3/2018 | Ota | G01R 31/396 |
| 2018/0175357 A1* | 6/2018 | Lin | H01M 2/266 |
| 2018/0198105 A1* | 7/2018 | Sato | H01M 10/482 |
| 2019/0103595 A1* | 4/2019 | Matsumura | H01M 2/206 |
| 2019/0109423 A1* | 4/2019 | Shimoda | H01G 2/04 |
| 2019/0221818 A1* | 7/2019 | Matsumura | H01M 2/20 |
| 2019/0363318 A1* | 11/2019 | Okutani | B23K 20/10 |
| 2020/0028143 A1* | 1/2020 | Xu | H01M 2/1077 |

FOREIGN PATENT DOCUMENTS

| | | |
|---|---|---|
| JP | 2013045508 A * | 3/2013 |
| JP | 2014-175291 A | 9/2014 |
| JP | 2015-022798 A | 2/2015 |
| JP | 2016-024933 A | 2/2016 |
| JP | 2016-062840 A | 4/2016 |
| JP | 2016-143584 A | 8/2016 |
| JP | 2017-098037 A | 6/2017 |
| JP | 2017-112063 | 6/2017 |
| JP | 2017-112066 | 6/2017 |
| JP | 2017-112067 | 6/2017 |
| JP | 2018-181678 A | 11/2018 |
| JP | 2018-181773 A | 11/2018 |
| WO | 2011/111678 A | 9/2011 |

* cited by examiner

CONNECTION MODULE

TECHNICAL FIELD

The present invention relates to a connection module, more specifically a flat-shaped connection module for use in a power storage module.

BACKGROUND ART

Power storage modules for vehicles such as electric cars and hybrid cars have an array of a plurality of batteries (power storage elements) with positive and negative electrode terminals. The electrode terminals of the adjacent batteries are connected together by bus bars included in a connection module such that the plurality of batteries are connected in series or in parallel.

To connect the plurality of batteries in series, in general, the electrode terminals of the two each adjacent power storage elements in one line are connected together by a bus bar corresponding to the one line in the connection module. In the other line, the electrode terminals of the two each adjacent batteries shifted in position by one battery from the two each adjacent batteries connected in the one line are connected together by a bus bar corresponding to the other line in the connection module.

As such a connection module, there is known a flat-shaped connection module that is simple in structure and is reduced in weight (for example, refer to Patent Document 1). Patent Document 1 discloses a technique for firmly coupling voltage detection lines and flat-plate conductors (bus bars) in a flat-shaped bus bar module (connection module) including the voltage detection lines and the flat-plate conductors.

RELATED ART DOCUMENT

Patent Document

Patent Document 1: Japanese Unexamined Patent Application Publication No. 2016-24933

DISCLOSURE OF THE PRESENT INVENTION

Problem to be Solved by the Invention

The conventional flat-shaped connection module as described in Patent Document 1 is simple in structure and is reduced in weight, but at the time of attachment of the connection module to the power storage elements, the connection module sags due to the weight of the metallic bus bars and thus cannot be necessarily attached in a smooth manner. In addition, with regard to handling of the connection module during the attachment of the connection module, if the operator's fingers touch the bus bars, the reliability of connection of the bus bars may be deteriorated. That is, it is not necessarily easy to handle the connection module at the time of attachment of the connection module to the power storage elements.

Accordingly, there is provided a flat-shaped connection module described herein that is improved in handling of the connection module at the time of attachment of the connection module to the power storage elements.

Means for Solving the Problem

A connection module disclosed herein is a flat-shaped connection module that is to be attached to a power storage element group formed by aligning a plurality of power storage elements with positive and negative electrode terminals, the connection module including: the plurality of bus bars that connect the positive and negative electrode terminals of adjacent power storage elements of the plurality of power storage elements; and a sheet member that holds the plurality of bus bars arranged in an alignment direction of the plurality of power storage elements. The connection module further includes: a first bus bar module that is attached to upper surfaces of the plurality of power storage elements at one end perpendicular to the alignment direction; a second bus bar module that includes the plurality of bus bars and the sheet member and is attached to the upper surfaces of the plurality of power storage elements at another end opposed to the one end; and an insulating fixing member that is coupled to the sheet member of the first bus bar module and the second bus bar module to integrate and fix the first bus bar module and the second bus bar module.

According to this configuration, the first bus bar module and the second bus bar module are integrated and fixed together by the insulating fixing member. This suppresses the sagging and twisting of the first bus bar module and the second bus bar module at the time of attachment to the power storage element group. Accordingly, it is possible to improve handling of the connection module at the time of attachment of the flat-shaped connection module to the power storage element group.

In the connection module, the fixing member may include a handle portion that is positioned between the first bus bar module and the second bus bar module while the first bus bar module and the second bus bar module are coupled together.

According to this configuration, the connection module can be held by the handle portion to further improve handling of the connection module.

In the connection module, the fixing member may be formed from a pair of fixing members that is coupled to an end of the sheet member of the first bus bar module and the second bus bar module as seen in the alignment direction.

According to this configuration, the fixing member is coupled to the end of the sheet member as seen in the alignment direction of the plurality of power storage elements. This makes the connection module easier to hold as compared to the case where the fixing member is coupled to the central portion or the like of the sheet member.

In the connection module, either one of the first bus bar module and the second bus bar module may include at both ends an external connection electrode bus bar to be connected to an external connection electrode terminal of the power storage element group, and the fixing member may include a bus bar fixing portion that fixes and holds the external connection electrode bus bar.

According to this configuration, the external connection electrode bus bars are fixed and held by the bus bar fixing portions. This suppresses horizontal inclination of the external connection electrode bus bars at the time of attachment of the external connection electrode bus bars to the external connection electrode terminals. Specifically, in a case where each of the external connection electrode bus bars is held on the sheet member by one through hole, when the external connection electrode bus bar is screwed with a nut to the external connection electrode terminal, the external connection electrode bus bar may incline in the horizontal direction. In such a case, the reliability of connection between the external connection electrode bus bar and the external connection electrode terminal may become lowered. According to this configuration, the external connection electrode bus bars are fixed by the bus bar fixing portions, which prevents such reduction in the reliability of the connection.

In the connection module, the fixing member may have a pair of sandwiching portions that sandwiches the sheet member of the first bus bar module and the second bus bar module such that the fixing member is coupled to the sheet member by sandwiching the sheet member between the pair of sandwiching portions.

According to this configuration, the fixing member is merely sandwiched by the sheet member between the sandwiching portions, and thus the fixing member can be connected to the sheet member with a simple configuration. In addition, after the attachment of the connection module to the power storage element group, the fixing member can be removed from the connection module as necessary.

Advantageous Effect of the Invention

According to the connection module of the present invention, it is possible to improve handling of the flat-shaped connection module at the time of attachment of the connection module to the power storage elements.

MODES FOR CARRYING OUT THE INVENTION

Embodiments

An embodiment of the present invention will be described with reference to FIGS. 1 to 9.

Figure 1:
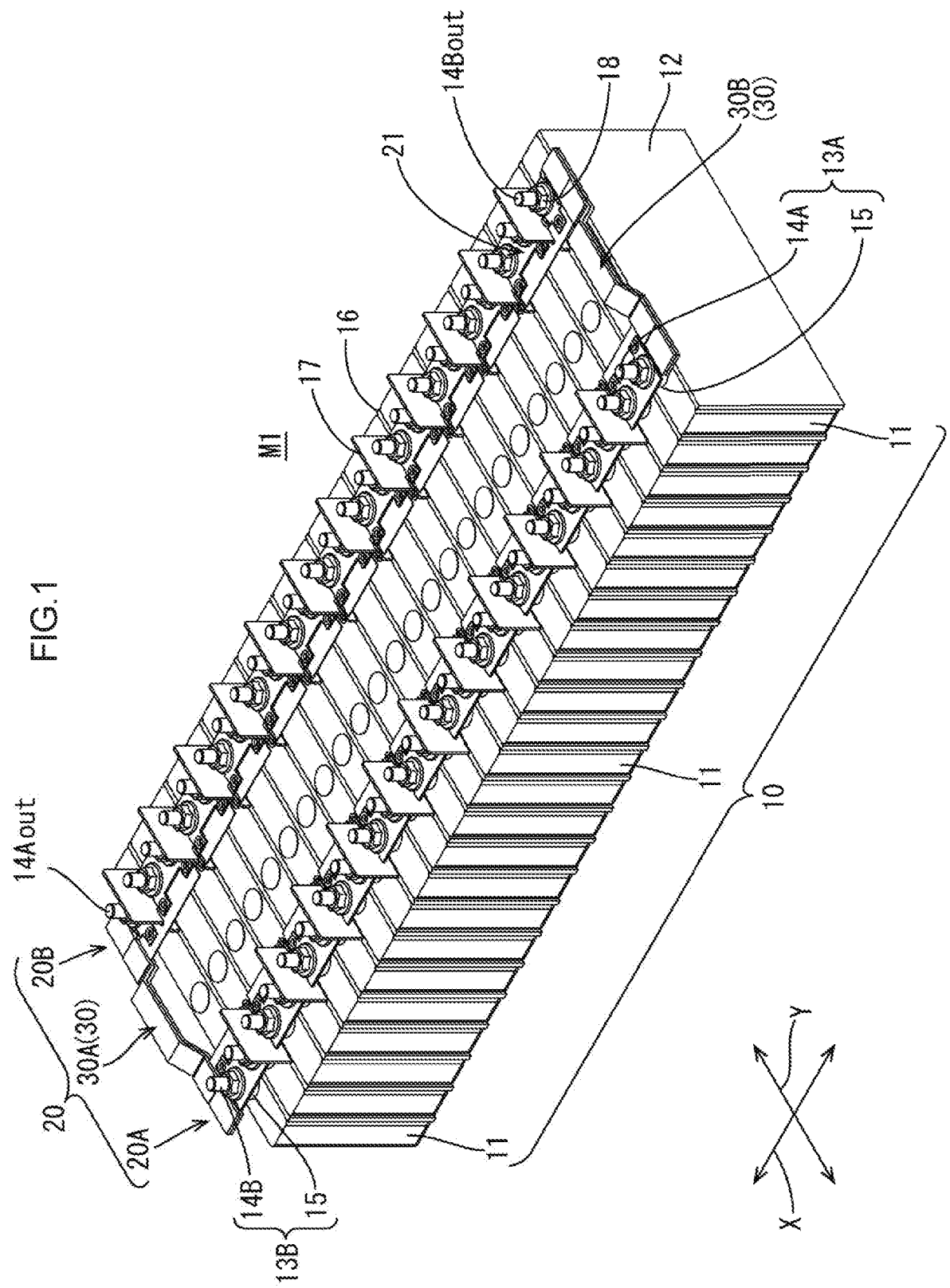
FIG. 1 is a perspective view of a power storage module including a connection module according to an embodiment.

As illustrated in FIG. 1, a power storage module M1 includes a connection module 20 in the present embodiment and a power storage element group 10 formed by aligning a plurality of power storage elements 11.

The power storage module M1 is used as a drive source for a vehicle such as electric car or hybrid car, for example. In the following descriptions, for a plurality of identical members, one of them may be given a reference symbol and the other members may be given no reference symbol and descriptions thereof may be omitted.

1. Power Storage Element Group

Figure 2:
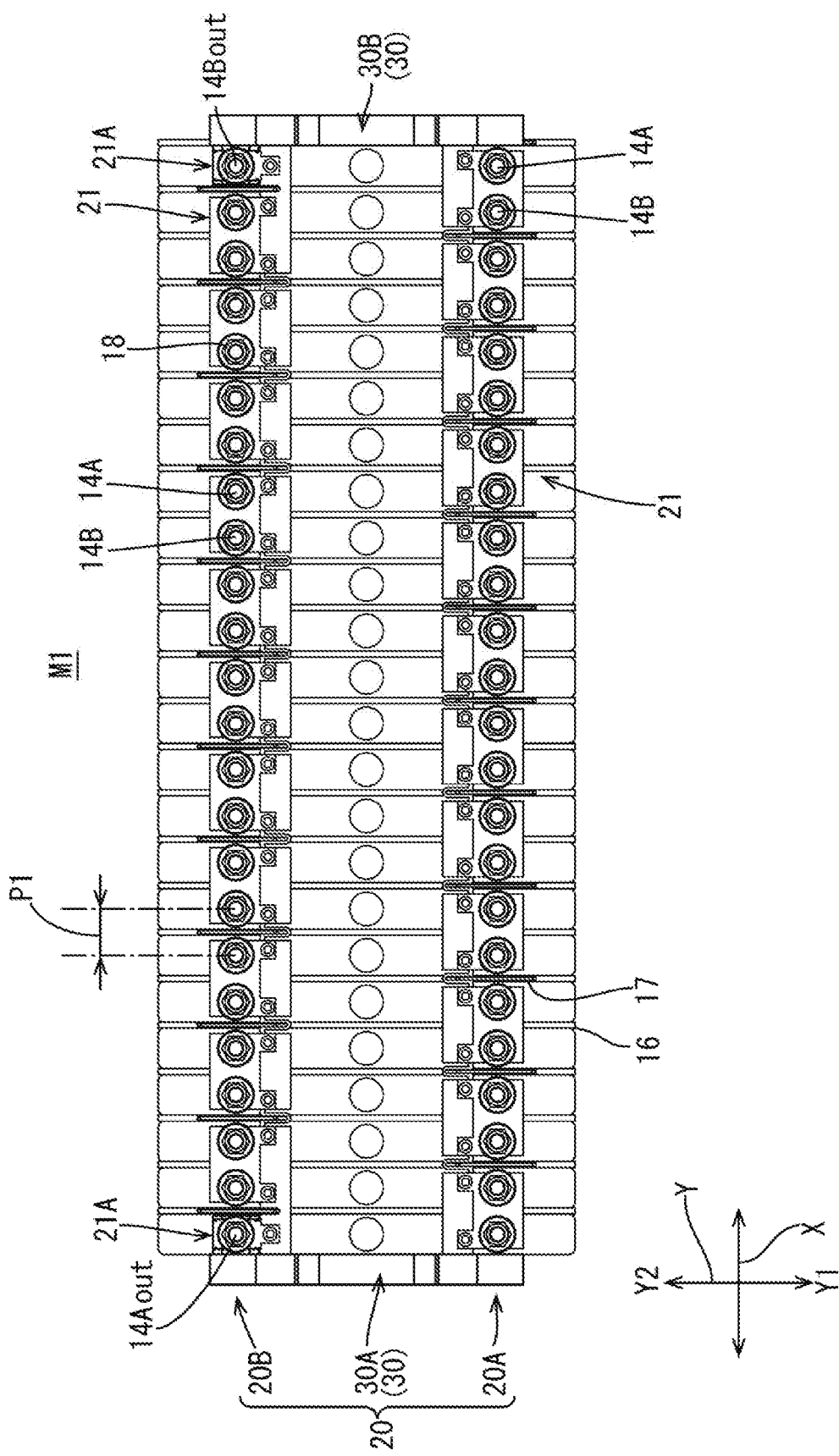
FIG. 2 is a planar view of the power storage module.

The power storage element group 10 to which the connection module 20 in the present embodiment is to be attached has a plurality of (24 in the present embodiment) power storage elements 11 aligned as illustrated in FIGS. 1 and 2.

Each of the power storage elements 11 has a positive electrode terminal portion 13A and a negative electrode terminal portion 13B that vertically protrude from an upper surface of a main body portion 12 in the shape of a flat rectangular parallelepiped that contains power storage components not illustrated.

Each of the electrode terminal portions 13 (13A, 13B) includes a terminal base 15 formed in the shape of a disc and electrode terminals 14 (14A, 14B) that are cylindrical in shape and protrude upward from the terminal base 15. The terminal insertion holes 24 of the bus bars 21 are to be fitted onto the electrode terminals 14 (see FIG. 3). Each of the electrode terminals 14 has a screw thread (not illustrated) at a side wall portion into which a nut 18 is to be screwed. Referring to FIG. 2, the negative electrode terminal 14 on the upper side (arrow Y2 side) of the power storage element 11 positioned at the right end (arrow X1 side end) is designated as external connection negative terminal (external connection electrode terminal) 14Bout, and the positive electrode terminal 14 on the upper side (arrow Y2 side) of the power storage element 11 positioned at the left end of FIG. 2 (arrow X2 side end) is designated as external connection positive terminal (external connection electrode terminal) 14Aout.

When the bus bars 21 fitted onto the electrode terminals 14 and the terminal bases 15 are brought into contact with each other, the bus bars 21 and the electrode terminals 14 are electrically connected to each other. The plurality of power storage elements 11 are disposed such that the electrode terminals 14 adjacent to each other in a lateral direction (arrow X direction) illustrated in FIG. 2 are opposite in polarity.

Separators 16 are provided between the adjacent power storage elements 11. Each of the separators 16 has an insulation rib 17 to insulate the electrode terminals 14 of the adjacent power storage elements 11.

2. Connection Module

Figure 3:
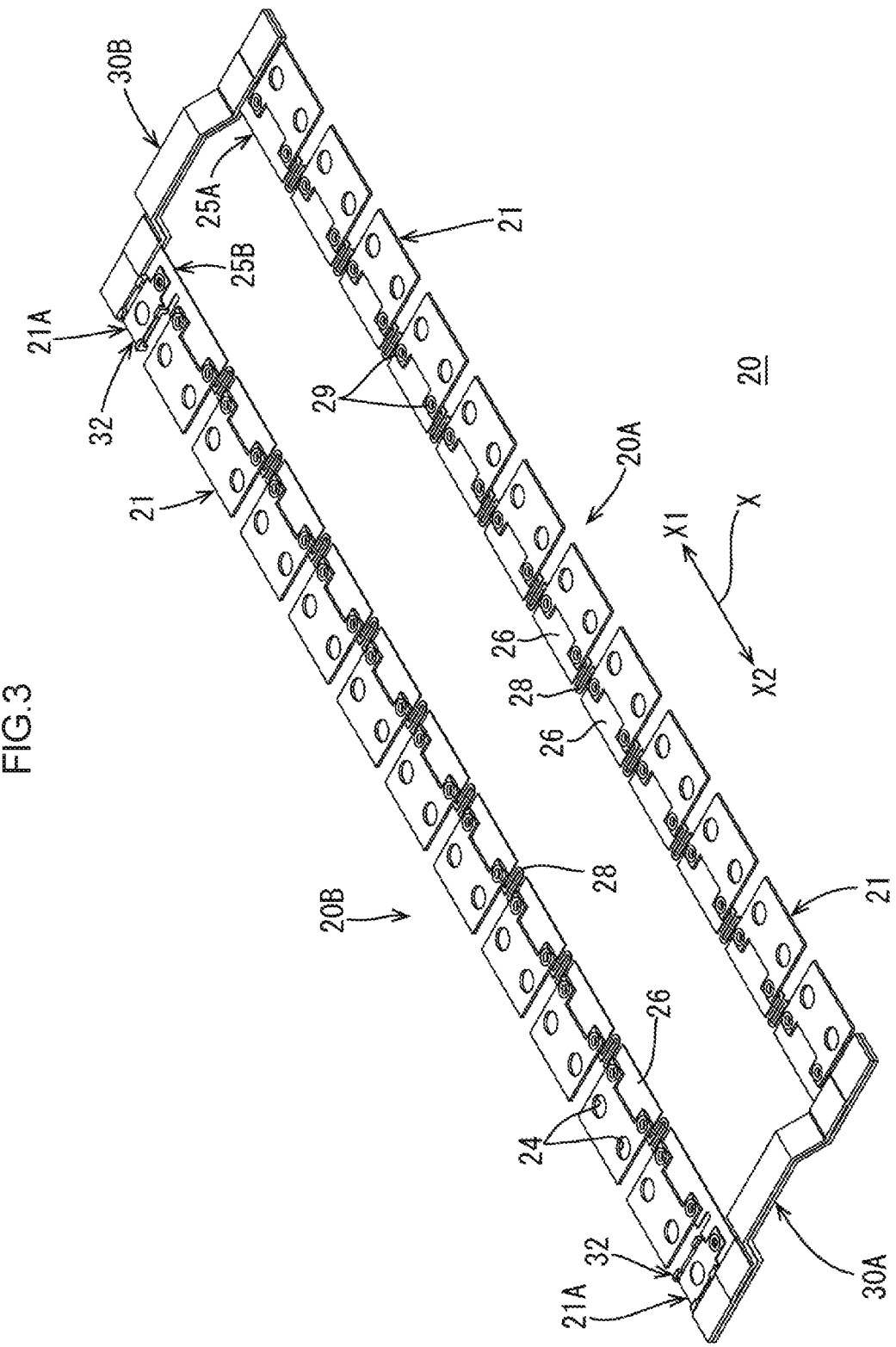
FIG. 3 is a perspective-view of the connection module according to the embodiment.

The connection module 20 is attached to the power storage element group 10 along the alignment direction of the power storage elements 11 (arrow X direction) as illustrated in FIGS. 1 and 2, and has a function of electrically connecting the plurality of power storage elements 11. The connection module 20 is a flat-shaped connection module and includes a first bus bar module 20A, a second bus bar module 20B, and a fixing member 30 as illustrated in FIG. 3.

Figure 4:
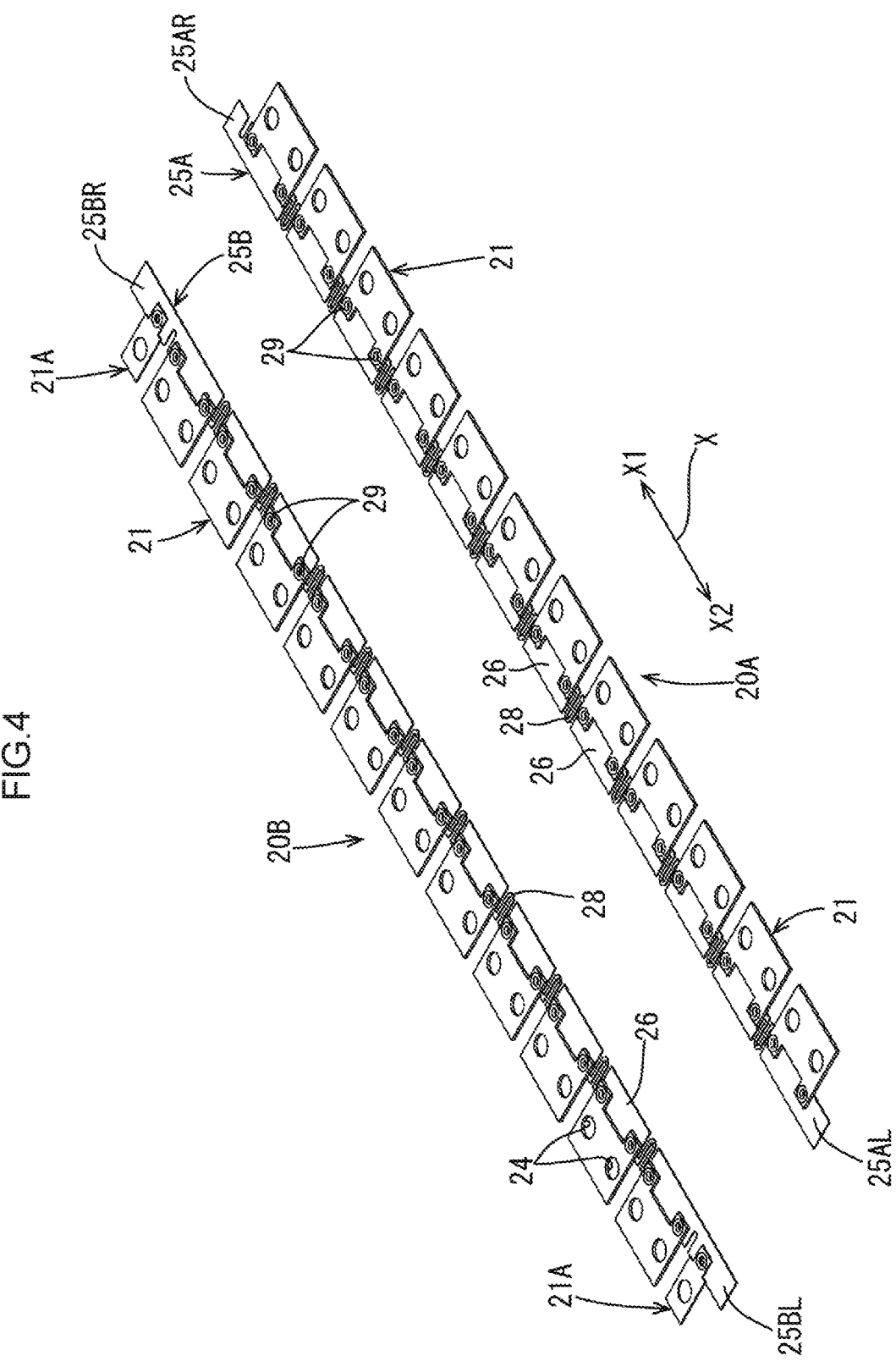
FIG. 4 is a perspective view of the connection module without a fixing member.

The first bus bar module 20A has a flat shape and includes a plurality of bus bars 21 and a first sheet member 25A as illustrated in FIG. 4. Each of the bus bars 21 connects the positive and negative electrode terminals 14 of the adjacent power storage elements out of the plurality of power storage elements 11. The first sheet member 25A holds the plurality of bus bars 21 arranged in the alignment direction of the plurality of power storage elements 11 (arrow X direction illustrated in FIG. 2). As illustrated in FIG. 2, the first bus bar module 20A is attached to upper surfaces of the plurality of power storage elements 11 at one end as seen in a direction (arrow Y direction illustrated in FIG. 2) perpendicular to the alignment direction of the plurality of power storage elements 11 (end as seen in arrow Y1 direction illustrated in FIG. 2). In other words, the first bus bar module 20A is attached to the electrode terminal row on the lower side (arrow Y1 side) illustrated in FIG. 2.

Similarly, the second bus bar module 20B has a flat shape and includes a plurality of bus bars 21 and a second sheet member 25B as illustrated in FIG. 4. Each of the bus bars 21 connects the positive and negative electrode terminals 14 of the adjacent power storage elements out of the plurality of power storage elements 11. The second sheet member 25B holds the plurality of bus bars 21 arranged in the alignment direction of the plurality of power storage elements 11 (arrow X direction illustrated in FIG. 2). As illustrated in FIG. 2, the second bus bar module 20B is attached to the upper surfaces of the plurality of power storage elements 11 at the other end opposed to the one end (arrow Y2 direction end illustrated in FIG. 2). In other words, the second bus bar module 20B is attached to the electrode terminal row on the upper side (arrow Y2 side) illustrated in FIG. 2.

The first bus bar module 20A and the second bus bar module 20B are different only in both end portions. Specifically, the second bus bar module 20B is provided with an external connection electrode bus bar 21A at both ends to take electric power from the power storage element group 10 as illustrated in FIG. 4 and others.

The terms "flat shape" here means that the connection module or the bus bar modules are mainly formed from a flat member such as the bus bars 21 and the sheet member 25, and are entirely flat in shape.

2-1. Bus Bars

The bus bars 21 connect the positive and negative electrode terminals 14A, 14B of the adjacent power storage elements 11. The bus bars 21 are formed from metal such as copper, copper alloy, stainless steel (SUS), or aluminum. Each of the bus bars 21 includes a plate-shaped portion 22 with a length corresponding to a dimension (electrode pitch) P1 between the adjacent electrode terminals 14A, 14B.

Figure 5:
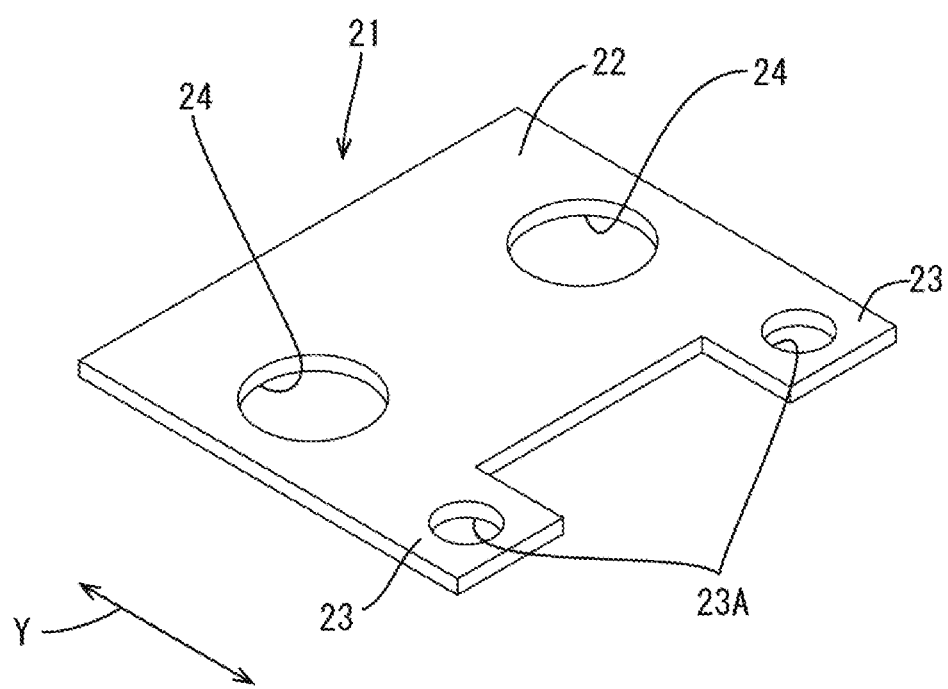
FIG. 5 is a perspective view of a bus bar.

Each of the plate-shaped portions 22 of the bus bars 21, except for the external connection electrode bus bars 21A at the both ends of the second bus bar module 20B, has a pair of terminal insertion holes 24, 24 therethrough into which the electrode terminals 14 are to be inserted as illustrated in FIG. 4. Each of plate-shaped portions 22A of the external connection electrode bus bars 21A has only one terminal insertion hole 24 therethrough as illustrated in FIG. 5. The terminal insertion holes 24 have the shape of an oval elongated in the alignment direction of the power storage elements 11 (the arrow X direction illustrated in FIG. 1).

Each of the bus bars 21 also has protrusion portions 23 that protrude from one end as seen in the width direction (the arrow Y direction), that is, from one long-side portion of the bus bar 21 as illustrated in FIG. 5. In the present embodiment, the protrusion portions 23 are provided on both ends of one long-side portion. Each of the protrusion portions 23 has a through hole 23A. As illustrated in FIG. 4, each of the bus bars 21 is fixed to a hold portion 26 of a sheet member 25 described later by rivets 29 penetrating through the through holes 23A and hold holes 27 of the sheet member 25 described later.

As described above, in the present embodiment, only the protrusion portions 23 of the bus bars 21 are directly held on the sheet member 25 such that the entire bus bars 21 are held on the sheet member 25. That is, the plate-shaped portions 22 of the bus bars 21 with the terminal insertion holes 24, 24 are not directly held on the sheet member 25.

Figure 6:
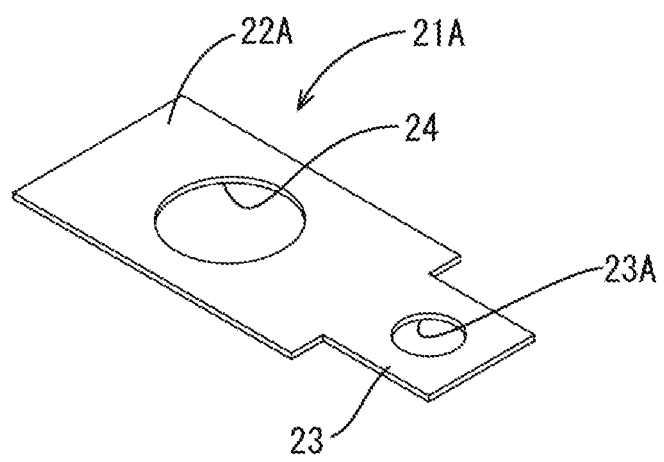
FIG. 6 is a perspective view of an external connection electrode bus bar.

In addition, as illustrated in FIG. 6, each of the external connection electrode bus bars 21A also has a protrusion portion 23 with a through hole 23A at one end and is held on the sheet member 25 at the protrusion portion 23.

2-2. Sheet Member

Figure 7:
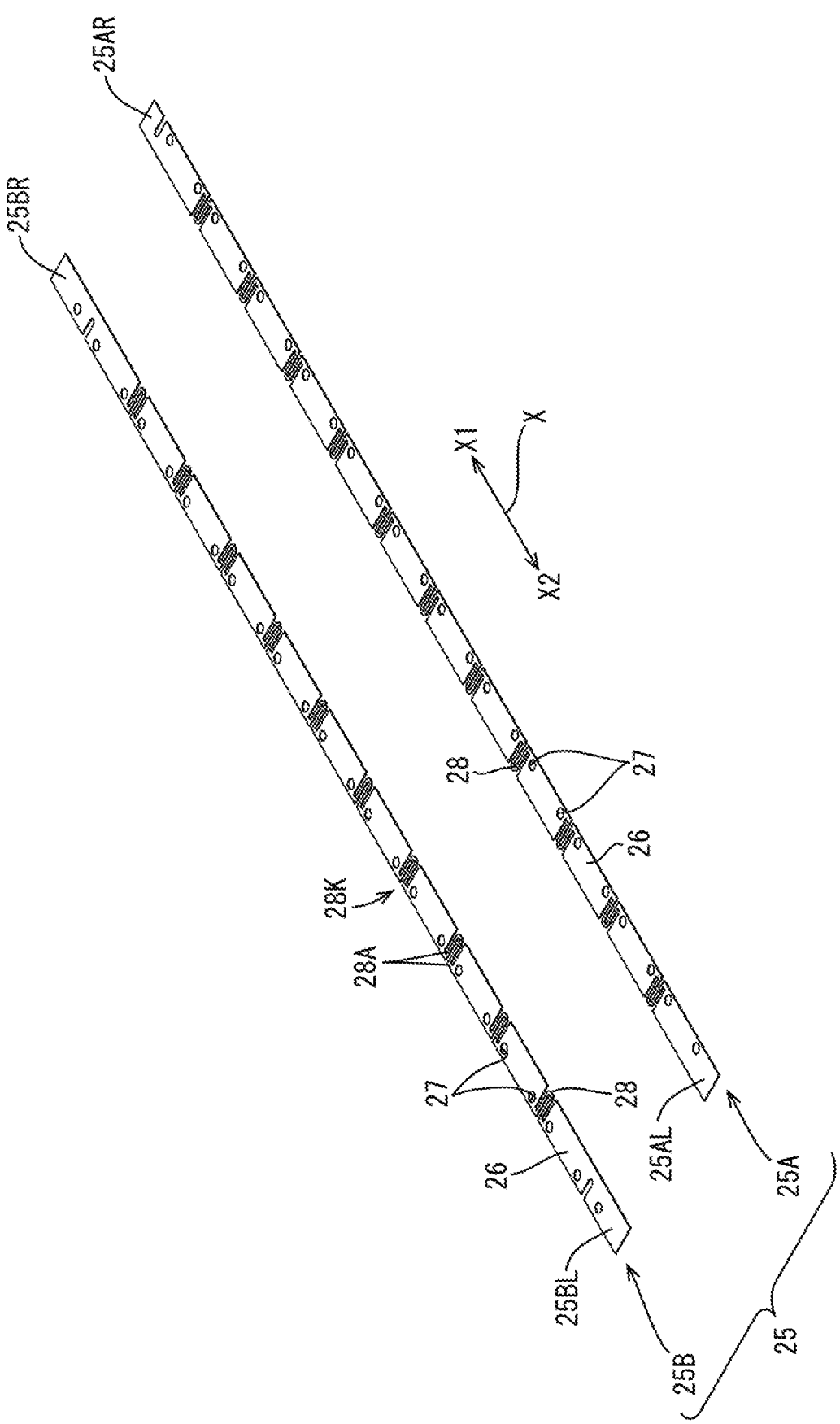
FIG. 7 is a perspective view of a sheet member of the connection module.

The sheet member 25 is elongated and substantially rectangular in a planar view and holds the bus bars 21 as illustrated in FIG. 7. The sheet member 25 includes the first sheet member 25A included in the first bus bar module 20A and the second sheet member 25B included in the second bus bar module 20B. The first sheet member 25A and the second sheet member 25B are different only in the configuration of both ends. Accordingly, the two sheet members 25A, 25B will be hereinafter described as "sheet member 25" unless there is no particular need for differentiation.

The sheet member 25 holds the plurality of bus bars 21 arranged in the alignment direction of the power storage elements 11 (the arrow X direction illustrated in FIG. 2). In the present embodiment, the sheet member 25 is formed from a rigid, non-stretchable, and electrically insulating material. Examples of material for the sheet member 25 include insulating materials such as polyethylene terephthalate (PET), polystyrene (PS), polycarbonate (PC), and polyamide (PA). In the present embodiment, the sheet member 25 is a hard synthetic resin sheet such as a polycarbonate sheet, for example. In other words, the sheet member 25 is formed from a synthetic resin without rubber elasticity. The planar shape of the sheet member 25 is not limited to that illustrated in FIG. 7. In addition, the material for the sheet member 25 is not limited to a rigid and non-stretchable material.

The sheet member 25 includes the hold portions 26 and extension and contraction portions 28. Each of the hold portions 26 has a pair of hold holes 27 at positions corresponding to the pair of through holes 23A of the bus bar 21. As described above, each of the bus bars 21 is fixed to the hold portion 26 of the sheet member 25 by the rivets 29 penetrating through the through holes 23A of the protrusion portions 23 and the hold holes 27 of the sheet member 25. The member for fixing the bus bars 21 to the sheet member 25 is not limited to the rivets 29.

Figure 9:
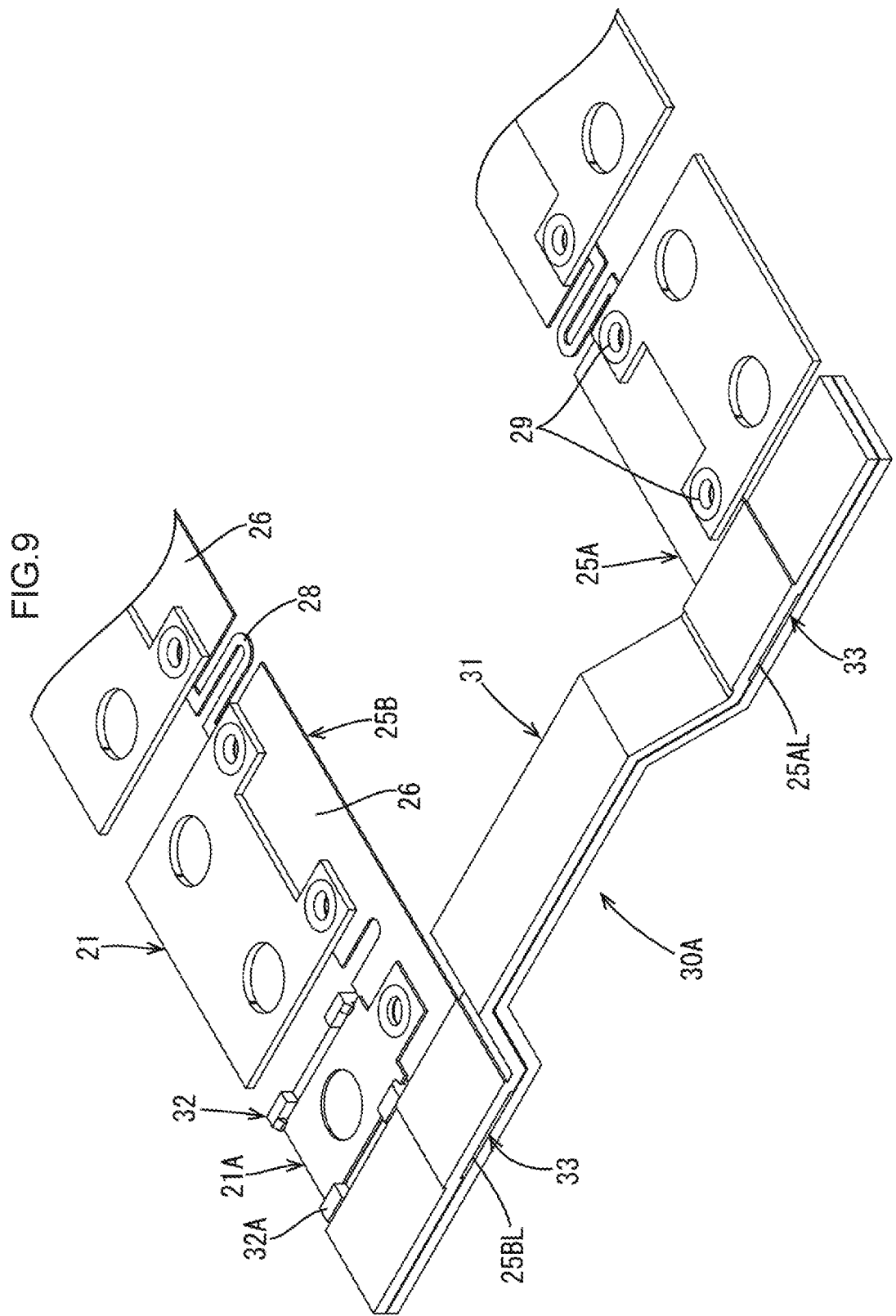
FIG. 9 is a partial enlarged planar view of the connection module.

Each of the extension and contraction portions 28 is positioned between the adjacent hold portions 26 and is integrally formed with the hold portion 26 as illustrated in FIG. 9. The extension and contraction portions 28 extend and contract in the alignment direction of the power storage elements 11 (the arrow X direction illustrated in FIG. 2). In the present embodiment, the extension and contraction portions 28 are U-shaped in a planar view and are formed by two-dimensional punching of the sheet member 25. Each of the extension and contraction portions 28 has two end portions positioned at an opening 28K in the U shape and connected to one each end of the adjacent hold portions 26 as seen in the alignment direction of the power storage elements 11. This configuration of the extension and contraction portions 28 allows the connection module 20 to follow the tolerance of electrode pitch P1 between the adjacent power storage elements 11. The flat shape of the extension and contraction portions 28 is not limited to a U shape but may be two U shapes aligned, for example.

2-3. Fixing Member

The fixing member 30 is coupled to the first sheet member 25A of the first bus bar module 20A and the second sheet member 25B of the second bus bar module 20B to integrate and fix the first bus bar module 20A and the second bus bar module 20B. The fixing member 30 is formed from an insulating synthetic resin. More specifically, in the present embodiment, the fixing member 30 is formed by coupling together an upper plate 35A and a lower plate 35B made of a synthetic resin as illustrated in FIG. 8.

In the present embodiment, the fixing member 30 is formed from a pair of fixing members 30A and 30B as illustrated in FIG. 3. Specifically, the fixing member 30A is coupled to an end 25AL on the left side (arrow X2 direction side illustrated in FIG. 4) of the first sheet member 25A of the first bus bar module 20A and an end 25BL on the left side of the second sheet member 25B of the second bus bar module 20B. On the other hand, the fixing member 30B is coupled to an end 25AR on the right side (arrow X1 direction side illustrated in FIG. 4) of the first sheet member 25A of the first bus bar module 20A and an end 25BR on the right side of the second sheet member 25B of the second bus bar module 20B.

The fixing member 30A and the fixing member 30B are different only in the arrangement of a bus bar fixing portion 32 as illustrated in FIG. 3. Accordingly, the fixing members 30A, 30B will be hereinafter described as "fixing member 30" unless there is no particular need for differentiation.

Figure 8:
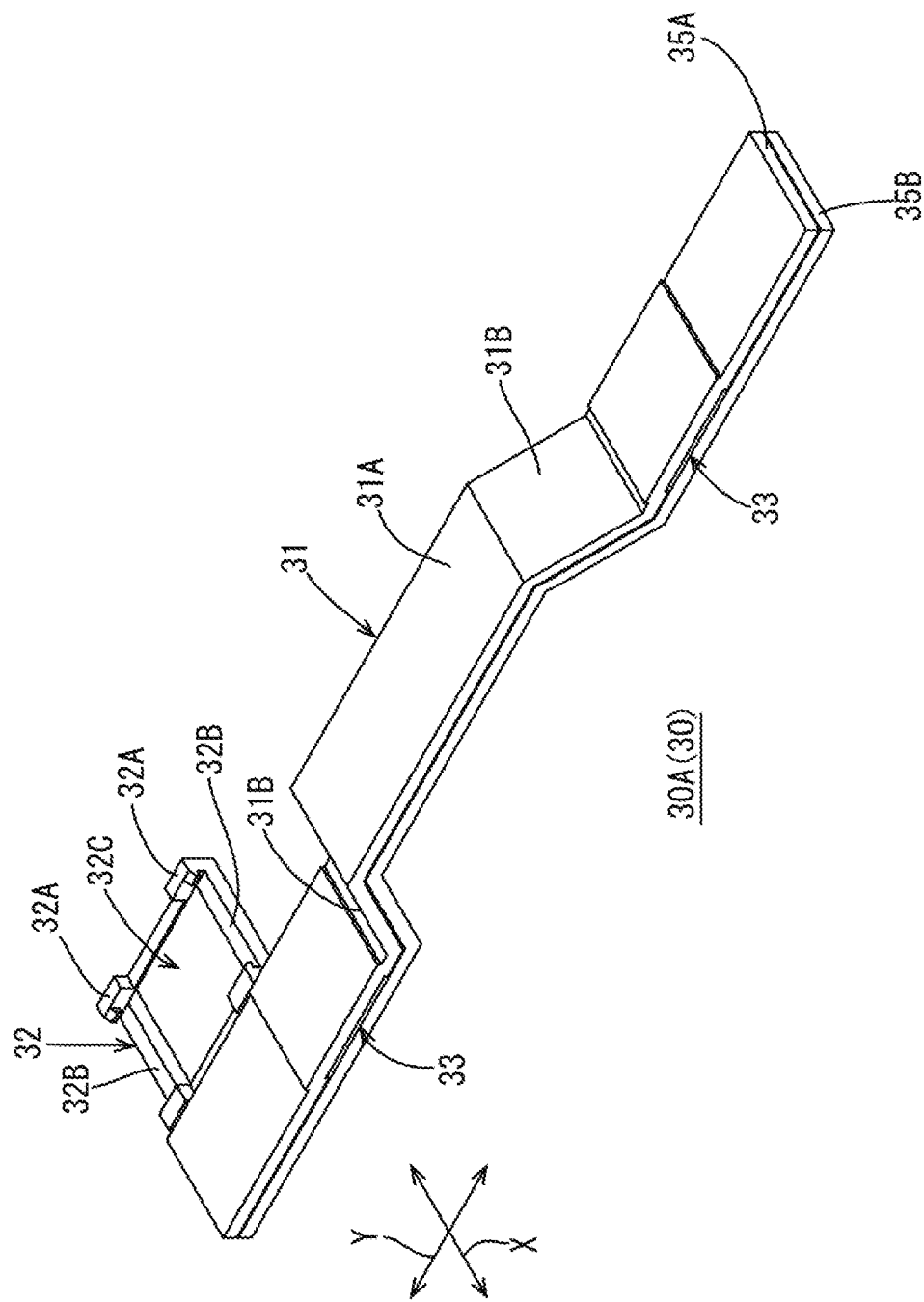
FIG. 8 is a perspective view of the fixing member.

As illustrated in FIG. 8, the fixing member 30 has a pair of sandwiching portions 33 that sandwiches the sheet members 25A, 25B of the first bus bar module and the second bus bar module. The fixing member 30 is coupled to the sheet member 25 by sandwiching the sheet member 25 between the pair of sandwiching portions 33. More specifically, the sandwiching portions 33 are formed from narrow slit-shaped holes as illustrated in FIG. 8. The ends (25AL, 25BL) (25AR, 25BR) of the sheet member 25 are inserted into the narrow slit-shaped holes.

The fixing member 30 also includes a handle portion 31 that is positioned between the first bus bar module 20A and the second bus bar module 20B while the first bus bar module 20A and the second bus bar module 20B are coupled together, as illustrated in FIG. 8. The handle portion 31 includes a flat plane portion 31A and tapered portions 31B formed at both ends of the flat plane portion 31A.

The fixing member 30 also includes the bus bar fixing portion 32 that fixes and holds the external connection electrode bus bar 21A. The bus bar fixing portion 32 is formed in a rectangular shape in a planar view and includes four retainer portions 32A, a pair of placement portions 32B, and an opening portion 32C as illustrated in FIG. 8. The retainer portions 32A are formed at the four corners of the rectangle, and the pair of placement portions 32B forms two sides opposed in the arrow Y direction illustrated in FIG. 8. Each of the external connection electrode bus bars 21A is fixed and held by the four retainer portions 32A and the pair of placement portions 32B as illustrated in FIG. 9. The shape and configuration of the bus bar fixing portion 32 are not limited to those illustrated in FIG. 8.

3. Method of Producing the Connection Module

A hard resin sheet is cut at once by, for example, two-dimensional punching into the shape illustrated in FIG. 7 to produce the sheet member 25. At the same time, the extension and contraction portions 28 and the hold holes 27 are formed by two-dimensional punching.

Next, the bus bars 21, 21A are fixed by the rivets 29 to the hold portions 26 of the sheet member 25. Accordingly, the first bus bar module 20A and the second bus bar module 20B as illustrated in FIG. 4 can be obtained. Then, the fixing members 30A and 30B are attached to the first bus bar module 20A and the second bus bar module 20B, whereby the connection module 20 as illustrated in FIG. 3 can be obtained.

4. Method of Assembling the Connection Module

Next, a method of assembling the connection module 20 into the power storage element group 10 will be described. The plurality of power storage elements 11 are aligned such that the adjacent electrode terminals 14 are opposite in polarity. Then, the separators 16 with the insulation ribs 17 and the power storage elements 11 are alternately disposed to sandwich the power storage element 11 between the separators 16.

Next, the connection module 20 is placed on the surface with the electrode terminals 14. The connection module 20 is attached and the electrode terminals 14 of the power storage element group 10 are inserted into the terminal insertion holes 24 of the bus bars 21, whereby the power storage module M1 as illustrated in FIG. 1 can be obtained.

5. Advantageous Effects of the Present Embodiment

The first bus bar module 20A and the second bus bar module 20B are integrated and fixed by the insulating fixing members 30A and 30B. This suppresses the sagging and twisting of the first bus bar module 20A and the second bus bar module 20B at the time of attachment to the power storage element group 10. This improves handling of the flat-shaped connection module 20 at the time of attachment of the connection module 20 to the power storage element group 10, which facilitates the attachment.

The fixing members 30A, 30B are provided with the handle portions 31 such that the worker can hold the connection module by the handle portions 31 This further improves handling of the connection module 20.

The fixing members 30A, 30B are coupled to the ends (25AL, 25BL), (25AR, 25BR) of the sheet member 25 in the alignment direction of the plurality of power storage elements 11 (arrow X direction illustrated in FIG. 2). This makes the connection module 20 easier to hold as compared to the case where the fixing members 30A, 30B are coupled to the central portion or the like of the sheet member 25.

The fixing members 30A, 30B are also provided with the bus bar fixing portions 32 that fix and hold the external connection electrode bus bars 21A. This suppresses horizontal inclination of the external connection electrode bus bars 21A at the time of attachment of the external connection electrode bus bars 21A to the external connection electrode terminals (14Aout, 14Bout). Specifically, in a case where each of the external connection electrode bus bars 21A is held on the sheet member 25 by the one through hole 23A, when the external connection electrode bus bar 21A is screwed with the nut 18 to the external connection electrode terminal 14out, the external connection electrode bus bar 21A may incline in the horizontal direction due to rotation of the nut 18. In such a case, the reliability of connection between the external connection electrode bus bar 21A and the external connection electrode terminal 14out may become lowered. According to this configuration, the external connection electrode bus bars 21A are fixed by the bus bar fixing portions 32, which prevents such reduction in the reliability of the connection.

The fixing members 30A, 30B are merely sandwiched by the sheet member 25 between the sandwiching portions 33, and thus the fixing members 30A, 30B can be attached to the sheet member 25 with a simple configuration. In addition, in the case where the fixing members 30A, 30B are not provided with the bus bar fixing portions 32, after the attachment of the connection module 20 to the power storage element group 10, the fixing members 30A, 30B can be removed from the connection module 20 as necessary.

OTHER EMBODIMENTS

The present invention is not limited to the embodiments described above and illustrated in the drawings. For example, the following embodiments fall within the technical scope of the present invention:

(1) In the foregoing embodiment, the fixing member 30 includes the handle portions 31 but the present invention is not limited to this. The fixing member 30 may not include the handle portions 31.

(2) In the foregoing embodiment, the fixing member 30 includes the bus bar fixing portions 32 but the fixing member 30 is not limited to this. The fixing member 30 may not include the bus bar fixing portions 32.

(3) In the foregoing embodiment, the fixing member 30 is formed from the pair of fixing members 30A and 30B that is coupled to the ends (25AL, 25BL, 25AR, 25BR) as seen in the alignment direction of the plurality of power storage elements 11 (arrow X direction illustrated in FIG. 2) of the sheet members 25A, 25B of the first bus bar module 20A and the second bus bar module 20B, but the fixing member 30 is not limited to this configuration. For example, the fixing members 30A, 30B may be coupled to the middle between the both ends of the sheet members 25A and 25B or one fixing member 30 may be coupled to the middle between the both ends of the sheet members 25A, 25B.

(4) In the foregoing embodiment, the fixing member 30 is coupled to the sheet member 25 by sandwiching the sheet member 25 between the pair of slit-shaped sandwiching portions 33, but the configuration of coupling the fixing member 30 to the sheet member 25 is not limited to this. For example, as in the case of coupling the bus bars 21 and the sheet member 25, the fixing member 30 and the sheet member 25 may be provided with through holes and coupled together via rivets inserted into both the through holes.

EXPLANATION OF SYMBOLS

10: Power storage element group
11: Power storage element
14A: Positive electrode terminal
14B: Negative electrode terminal
14Aout: External connection positive terminal (External connection electrode terminal)
14Bout: External connection negative terminal (External connection electrode terminal)
20: Connection module
20A: First bus bar module
20B: Second bus bar module
21: Bus bar
21A: External connection electrode bus bar
25: Sheet member
25A: First sheet member (Sheet member)
25AL, 25AR: End of first sheet member
25B: Second sheet member (Sheet member)
25BL, 25BR: End of second sheet member
30: Fixing member
31: Handle portion
32: Bus bar fixing portion
33: Sandwiching portion
M1: Power storage module

The invention claimed is:

1. A flat-shaped connection module that is to be attached to a power storage element group formed by aligning a plurality of power storage elements with positive and negative electrode terminals, the connection module comprising:
the plurality of bus bars that connect the positive and negative electrode terminals of adjacent power storage elements of the plurality of power storage elements; and
a sheet member that holds the plurality of bus bars arranged in an alignment direction of the plurality of power storage elements, wherein
the connection module further comprises:
a first bus bar module that is attached to upper surfaces of the plurality of power storage elements at one end perpendicular to the alignment direction;
a second bus bar module that includes the plurality of bus bars and the sheet member and is attached to the upper surfaces of the plurality of power storage elements at another end opposed to the one end; and
an insulating fixing member that is coupled to the sheet member of the first bus bar module and the second bus bar module to integrate and fix the first bus bar module and the second bus bar module, and
the fixing member including a bus bar fixing portion that fixes and holds an external connection electrode bus bar to be connected to an external connection electrode of the power storage element group.

2. The connection module according to claim 1, wherein the fixing member includes a handle portion that is positioned between the first bus bar module and the second bus bar module while the first bus bar module and the second bus bar module are coupled together.

3. The connection module according to claim 1, wherein the fixing member is formed from a pair of fixing members that is coupled to an end of the sheet member of the first bus bar module and the second bus bar module as seen in the alignment direction.

4. The connection module according to claim 3, wherein either one of the first bus bar module and the second bus bar module includes at both ends the external connection electrode bus bar.

5. The connection module according to claim 1, wherein the fixing member has a pair of sandwiching portions that sandwiches the sheet member of the first bus bar module and the second bus bar module such that the fixing member is coupled to the sheet member by sandwiching the sheet member between the pair of sandwiching portions.

6. The connection module according to claim 1, wherein the bus bar fixing portion is formed in a rectangular shape in a planar view and includes four retainer portions, a pair of placement portions, and an opening portion, wherein the retainer portions are formed at four corners of the rectangle, and the pair of placement portions forms two opposing sides, and wherein each of the external connection electrode bus bars is fixed and held by the four retainer portions and the pair of placement portions.

* * * * *